UNITED STATES PATENT OFFICE.

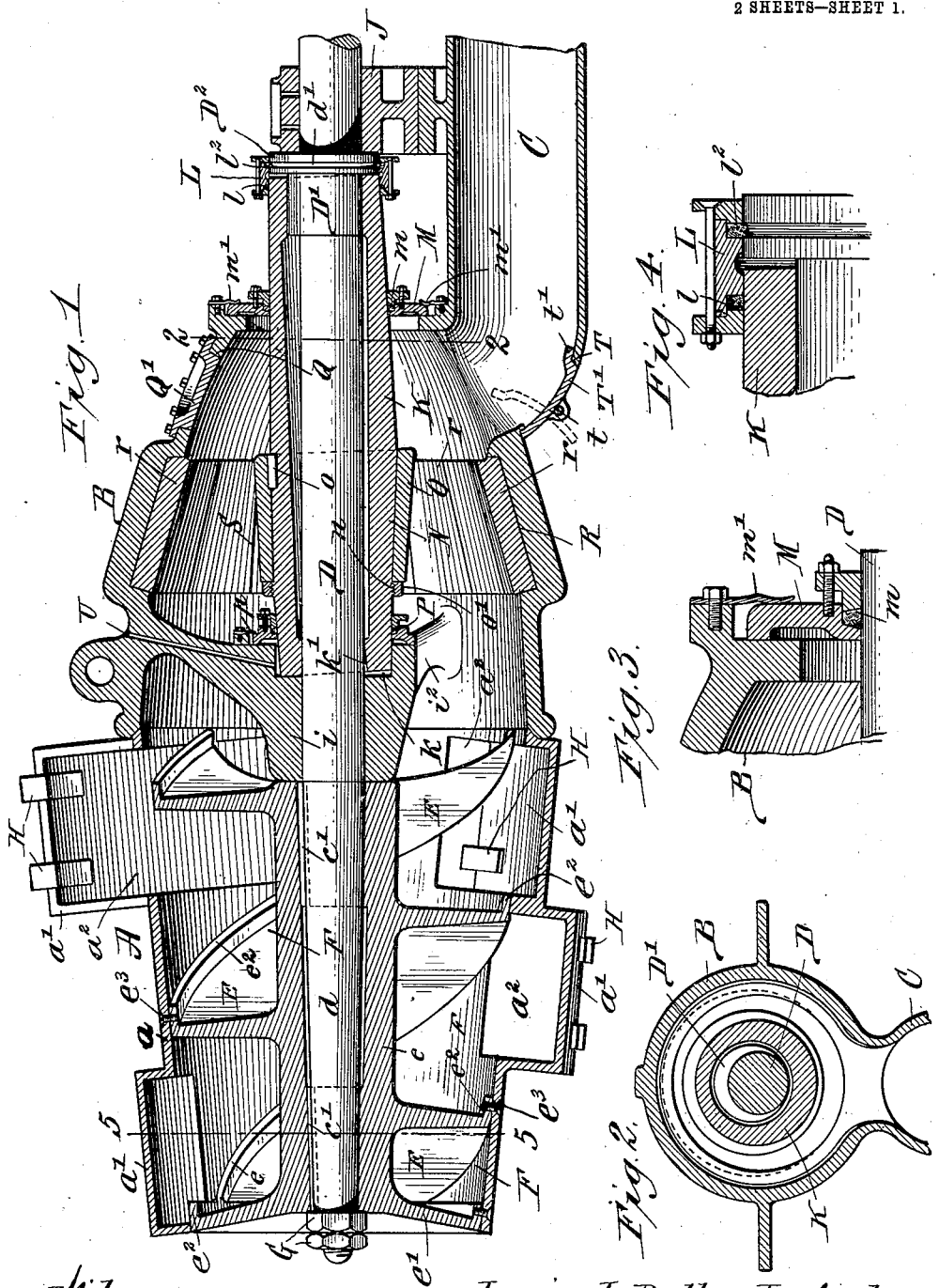

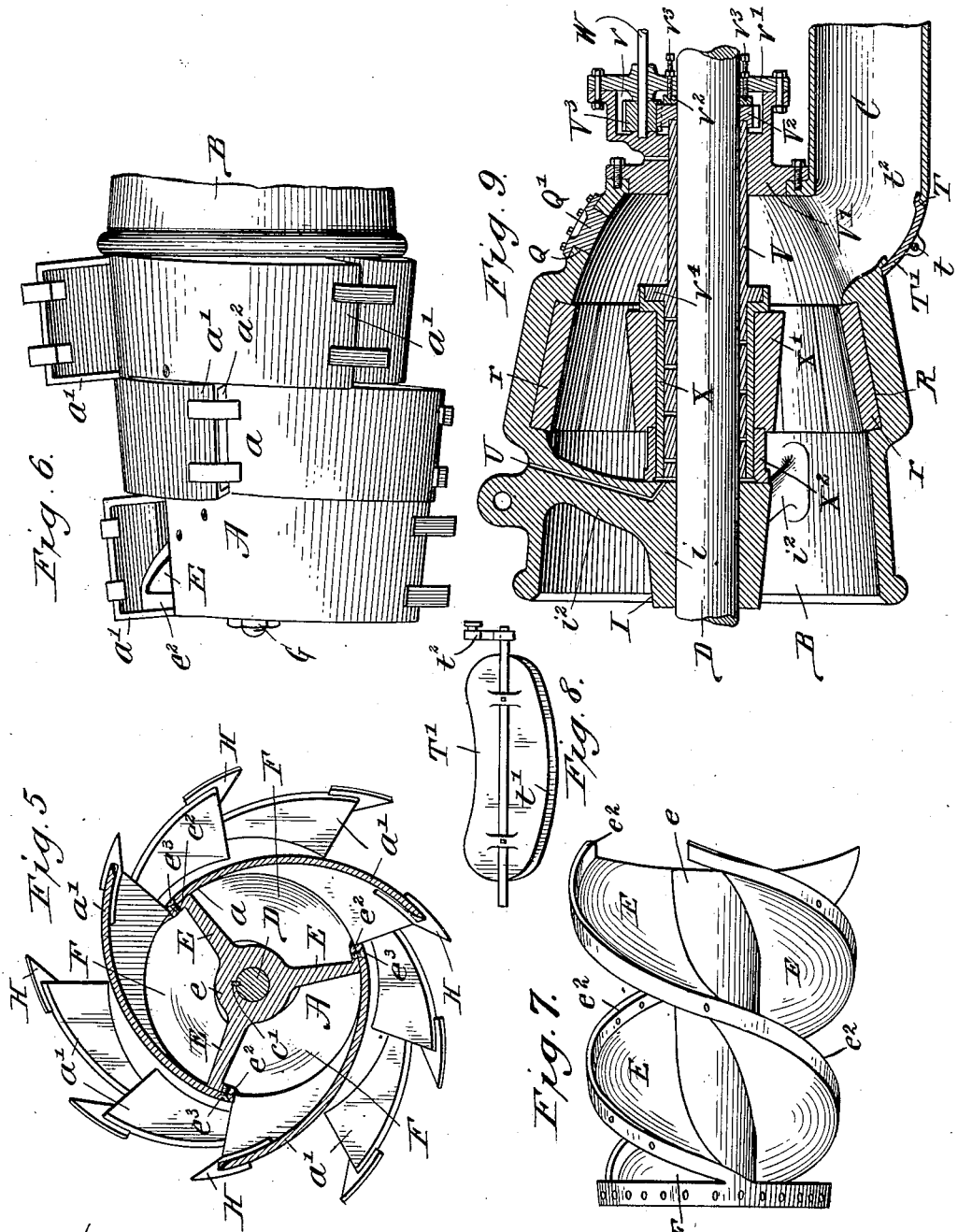

LOUIS J. BALTZ, OF BUFFALO, NEW YORK.

DIGGING IMPLEMENT.

1,087,269.  Specification of Letters Patent.  Patented Feb. 17, 1914.

Application filed December 10, 1910. Serial No. 596,662.

*To all whom it may concern:*

Be it known that I, LOUIS J. BALTZ, a citizen of the United States, residing at Buffalo, in the county of Erie and State of New York, have invented certain new and useful Improvements in Digging Implements, of which the following is a specification.

My invention relates to digging implements and more particularly to improvements in implements of this character adapted for use in hydraulic dredging-machines wherein provision is made for drawing the material dug by the implement into and through a tube by means of a pump.

Heretofore digging implements used on dredging-machines have been successful in digging sand, gravel, or other material or substances containing a large percentage of voids; but in digging stiff clay, hard pan or similar soil in which voids are not present, it has been impossible to successfully operate a digging implement combined with a suction tube.

The primary object of my invention is to provide a digging implement especially adapted for digging stiff clay, hard pan or similar soil and to mechanically create voids in such material so that a hydraulic pump can be used in connection with the digging implement with as much success as when pumping sand or gravel.

Another object of my invention is the provision of a rotatable digger having peripheral scoops at different points around its circumference so that it will dig into the soil and loosen a small quantity with each scoop, thereby diminishing the possibility of clogging the digger.

Another object of my invention is the provision of a hollow digger having scoops arranged circumferentially in a plurality of longitudinal series and to so construct the digger that the scoops of one series loosen and remove the soil and govern the amount of soil that can be dug up by the adjacent series; these series of scoops acting in effect to cut slices or chunks of the hard soil in succession.

A further object of my invention is the provision of teeth or rooters at the cutting edges of the scoops serving to dig into the soil and cause the same to be scooped up in small chunks, thus creating voids in the soil as it passes through the digger, said teeth or rooters being also of advantage in loosening the soil when it contains a large percentage of stone.

Still further objects are, the provision of a digger having means to assist in forcing the soil through the digger; the provision of means for crushing stone or other solid matter that may be present in the clay, hard pan, or other soil as it passes through the digger, the stone or solid matter being crushed so that it can easily be passed through the pump; and also to provide means to prevent stoppage of the pump in the event of the digger becoming clogged.

With these and other objects in view, my invention consists in the construction of the digger, and in the arrangement and combination of devices as well as the construction, arrangement, and combination of parts to be hereinafter described and particularly pointed out in the subjoined claims.

In the drawings,—Figure 1 is a central longitudinal section of a digging implement illustrating my invention in a representative way. Fig. 2 is a transverse section taken on line 2—2, Fig. 1. Fig. 3 is a detail section of the improved stuffing-box with which my improved digging implement is equipped. Fig. 4 is a detailed section of the packing-device located around the digger-shaft and one end of the crusher-shaft. Fig. 5 is a transverse section taken on line 5—5, Fig. 1, on a reduced scale. Fig. 6 is a side elevation of the digger proper. Fig. 7 is a detached view of the worm or conveyer removed from the digger shell. Fig. 8 is a side elevation of the relief gate. Fig. 9 is a central longitudinal section of a modified form of crusher adapted for use with my improved digger.

Referring now to the drawings in detail, corresponding characters of reference refer to corresponding parts in the several figures.

As my improved digging implement, in the embodiment of my invention illustrated, is adapted for use on hydraulic dredging-machines equipped with a pump and suction pipe through which the material dug is to be drawn and delivered by the pump to any desired point, I have so devised the implement that a portion thereof will serve as a part of the suction pipe; and when adapting the invention for such use, it comprises the digger proper, designated A, a crushing-device B, and a suction tube C. Passing centrally through the crushing-device is a shaft D having its outer end tapered, as at $d$, and onto said tapered end the digger A is secured, as will be described hereinafter.

The digger comprises a shell $a$ having one or more series of digging-scoops $a^1$, the scoops of each series being arranged at different points circumferentially and the series being ranged lengthwise on the digger shell. As shown in the drawings, the scoops are formed by curving the walls outward out of true circle with the shell proper to provide inlet-openings $a^2$ for the admission of the soil into the digger-shell. The digger is provided internally with means assisting in directing the material dug toward the suction tube; and in the particular embodiment described, I provide a worm or conveyer having one or more spiral walls E which extend outward from an elongated hub $e$ having a disk $e^1$ at its outer end serving to close the outer end of the digger shell and from which disk the spiral wall or walls extend rearward around said hub or partly around the same, as the case may be, to the rear end of the digger shell. The outer edges of said spiral walls and also the outer edge of the disk $e^1$ have lateral flanges $e^2$ into which take screws $e^3$ that are passed through the digger-shell. As the digger-shell is tapered, the spiral walls become gradually widened toward their rear ends and they extend from the hub $e$ to the interior surface of the digger-shell at all points and thus provide, when two or more series of digger scoops are used, separated spiral passages F; the spiral walls being so arranged that a passage is provided for each scoop of the first series and so that a scoop of each of the remaining series feeds into a passage. Said conveyer acts to direct the material dug by said scoops through the shell from all points in the circumference of the same.

Where the construction described is resorted to as an embodiment of my invention, the shaft D is passed through the hub $e$ of the digger, which hub is tapered to correspond with the end of said shaft and keyed thereon by means of keys $c^1$ so as to assure the proper rotation of the digger with said shaft. To prevent lengthwise displacement of said digger from the shaft, nuts G are threaded onto the extremity of the shaft, one of said nuts bearing against the end of the hub with the other nut jamming against the first as a secure means of holding the digger in place. The rear or inner end of the digger-shell is open and the spiral passages F terminate at this point and consequently permit a free discharge of the material from the digger. By gradually enlarging the digger-shell toward the discharge end, clogging of material as it passes therethrough is prevented; and in addition to this advantage it provides, when a plurality of circular series of scoops are used for the cutting away of the soil, that the scoops of the outer series will prepare the soil for the succeeding series, thus eliminating the possibility of the scoops working into the soil and becoming fast in the attempt to cut away larger chunks or portions than intended for passage through the digger.

When digging hard pan containing stone or other material having a large percentage of stone, I preferably equip the scoops with teeth or rooters H, any desired number being used for each scoop. These teeth or rooters assist in loosening the soil and cause it to enter the digger in small chunks so that it can be easily drawn therethrough and into the pump (not shown) from which it may be discharged to any desired point. These teeth are also of value when the soil does not contain stone, since they extend beyond the edge of the scoops and during the rotation of the digger, cut narrow furrows into the soil, consequently the soil is carried into the digger in small chunks so that the material passes through the digger with a large percentage of voids and makes the apparatus as effective on soil of this nature as when digging sand or gravel. These teeth or rooters may be permanently fastened to, formed integrally with, or removably applied to the scoops, as may be desired; and as I deem this merely a matter of mechanical skill, I desire to have the illustration thereof considered as fully disclosing such alternate arrangements.

The crushing device B comprises a shell preferably tapered opposite to the taper of the digger and having its front end open and in contact with the rear end of the digger; it forming a crusher chamber in rear of the digger, which in effect can be considered as an extension of the digger, and at the rear end of said crusher-shell I connect the suction tube C. Said crusher-shell and tube are held in fixed position in any suitable manner on a boom, crane, or other object and serve as a support for the shaft D. For this purpose the crusher-shell is provided internally at its front end with a spider I, comprising a hub $i$ and radial arms $i^2$ connecting the hub with the crusher-shell; said hub serving as a journal for the digger-shaft which is also journaled in a bearing J secured to the suction tube C in rear of the crusher-shell. The crusher-shell is open at its rear or inner end and is made preferably integral with the suction tube C, or at least with a portion of the suction tube adjacent thereto. The digger-shaft D may be rotated in any suitable manner and at a point outside of the crusher shell it is provided with an eccentric portion $D^1$ and with a collar $D^2$ having a circumferential groove $d^1$ formed therein.

Surrounding the digger-shaft D is a hollow shaft K which may well be termed an auxiliary or crusher-shaft, the forward end of said shaft being entered in a depression $k$ formed in the hub of the spider I; said depression being of slightly larger diameter than that of the hollow shaft entered therein, the rear end of said hollow shaft fitting onto the eccentric portion $D^1$, of the digger-shaft. Since in the operation of the digging implement the digger-shaft compels the hollow crusher-shaft to gyrate, the internal portion of said crusher-shaft is hollowed out to a greater diameter than the ends and the forward end of said shaft has its bore slightly flared, as at $k^1$ so that when the hollow crusher-shaft changes its position by reason of its being moved by the eccentric portion of the digger-shaft, the necessary play at the forward end thereof will be provided. Owing to the construction described, the axis of the hollow crusher-shaft is at a sight angle to that of the digger-shaft which it surrounds, and therefore sufficient play must be allowed between the rear ends of said crusher-shaft and the collar $D^2$ which acts as a stop for said crusher-shaft; and to prevent leakage of fluid matter at this point, a suitable packing-device L surrounds the collar $D^2$ and the adjacent end of the crusher-shaft and has packing material $l$ clamped around the crusher-shaft and packing material $l^2$ clamped into the groove $d^1$ of said collar.

The crusher-shaft extends through the rear open end of the crusher-shell and at this point I provide a closure M with a suitable stuffing-box $m$ to prevent escape of fluid material along the crusher shaft. The closure M is slidably held against the rear face of the crusher-shell by means of clips $m^1$ secured to said shell and bearing against the marginal portion of said closure, thus enabling the latter to move and accommodate itself to the movement of the crusher shaft.

The crusher-shaft is tapered near its front end, as at N, and provided with an externally threaded portion adjacent thereto, as at $n$. Surrounding said tapered portion is a crusher-head O which is keyed to the crusher-shaft by means of a key $o$ to prevent rotation thereof; said head being held against displacement lengthwise by a lock nut $o^1$ threaded onto the threaded portion $n$ and bearing against the front end of said head.

Surrounding the crusher-shaft between the lock-nut $o^1$ and the spider I of the crusher shell, is a stuffing-box P, it being held slidably against said spider by means of clips $p$ secured to the latter and bearing against the marginal portion of said stuffing-box so that the latter may move and accommodate itself to the movements of the crusher-shaft. In order that access may be had to the interior of the crusher-shell, a handhole Q is provided in the wall of said shell which is closed by a cover $Q^1$. The wall of the shell is made considerably heavier where it surrounds the crusher-head O so that it will be able to withstand the crushing strain to which it may be subjected, and at this point it is provided with a circular depression R in which chilled iron or other hardened metal staves $r$ are inserted, said staves serving as a crusher-lining which is tapered rearwardly while the crusher-head O, which said lining surrounds, is tapered forwardly and like said lining is also made of chilled iron or other hardened metal. By tapering the crusher-lining and crusher-head in opposite directions, a circular crushing-space S is formed between the two which is gradually restricted in area toward the rear end of the crusher-shell so that stones or other solid matter entering said crusher space will be effectively clamped by the crusher-head, and during the gyrating movement of said head be crushed into small particles, thus allowing the material to continue in its course through the crusher-shell and into the suction-tube, to be delivered from the latter in the usual manner.

In the event of the crusher or the digger becoming clogged by the material intended to be passed therethrough, I provide means to allow the continued operation of the pump, and for this purpose the suction tube is equipped with an opening T, normally closed by a valve or grate $T^1$ pivotally attached to the suction tube so that it may open and close the said opening. Said gate is preferably hinged at a central point, as at $t$, and it has an off-set flange $t^1$ which normally bears against the inner surface of the crusher-tube; suitable means, such a lever $t^2$ being provided for manipulating said valve or gate. The opening of the latter will cause water to be drawn into the suction-tube and to the pump so that the latter may continue to operate, and by means of bars or other suitable implements passed through the hand-hole Q of the crusher-shell, the material clogged in the crusher or digger can be loosened and removed so that upon closing the valve or gate T, the pump will immediately act upon the material in the digger and crusher.

An oil passage U is formed in one of the arms $i$ of the spider I and extends from the exterior of the crusher-shell to the depression $k$ in the spider, thus enabling the operator to supply the wearing parts of the digger and crusher shafts with oil.

Although I consider the crushing-device described as having considerable merit for the purpose intended, the substitution of other crushing-means come fully within the range of my invention, and as one of the many substitutions possible, I illustrate a modified form of crusher in Fig. 9. In this modified form the digger-shaft D is also surrounded by a crusher-shaft, designated V, which extends through a removable head $V^1$ closing the rear end of the crusher-shell. This head has a depression $v$ forming a gear casing which is closed at its rear end by a plate or cover $v^1$ through which the digger-shaft D extends. Secured to the rear end of the crusher-shaft V in any suitable manner is a gear wheel $V^2$ against which is held a thrust-collar $v^2$ which surrounds the digger-shaft and is forced against said gear wheel by the thrust screws $v^3$. These parts are located in the gear-casing $v$ as is a pinion $V^3$ in mesh with said gear-wheel and secured to a driving shaft W journaled in the cover $v^1$ of the gear-casing and in the gear-casing itself. Intermediate its ends, the crusher-shaft V is provided with a collar $v^4$ and forward of said collar said crusher-shaft is made eccentric and is surrounded by a brass or other wearing sleeve X which abuts against the collar $v^4$. Surrounding said wearing sleeve is a crusher-head $X^1$, between the front end of which and the spider I of the crusher-shell a distance-sleeve $X^2$ is interposed. In this construction the digger-shaft and the crusher-shaft are operated by independent means and the rotation of the crusher shaft causes a gyrating movement of the crusher-head, whereby rocks or other solid matter entering the crusher-shell are effectively crushed.

Having thus described my invention, what I claim is,—

1. A rotatable digger comprising a tapering shell having a plurality of peripheral scoops arranged in series lengthwise on said shell and spiral passages in said shell closed at the small end of the latter and open at the rear end thereof, each spiral passage receiving the material dug by one of each of the series of scoops.

2. A rotatable digger comprising a shell having peripheral scoops, an elongated hub arranged axially in said shell and having spiral walls extending therefrom to the inner surface of the shell and a disk at one end of said hub closing the corresponding end of said shell, said spiral walls extending from said disk to the opposite end of said shell to form spiral passages through which the material dug by said scoops is passed.

3. In a digging-implement, the combination of a rotatable digger having digging elements, inlet-openings and an outlet, a suction-tube, and a crushing-device between said digger and said suction-tube receiving from said digger the material dug thereby and directing the same into said suction-tube.

In testimony whereof, I have affixed my signature in the presence of two subscribing witnesses.

LOUIS J. BALTZ.

Witnesses:
 ELLA C. PLUECKHAHN,
 EMIL NEUHART.

---

Copies of this patent may be obtained for five cents each, by addressing the "Commissioner of Patents, Washington, D. C."